(12) United States Patent
Ooya

(10) Patent No.: US 9,223,110 B2
(45) Date of Patent: Dec. 29, 2015

(54) LENS BARREL, IMAGING APPARATUS, AND INFORMATION DEVICE

(75) Inventor: Takahiro Ooya, Yokohama (JP)

(73) Assignee: RICOH COMPANY, LTD., Tokyo (JP)

(*) Notice: Subject to any disclaimer, the term of this patent is extended or adjusted under 35 U.S.C. 154(b) by 64 days.

(21) Appl. No.: 13/474,107

(22) Filed: May 17, 2012

(65) Prior Publication Data

US 2012/0300314 A1 Nov. 29, 2012

(30) Foreign Application Priority Data

May 23, 2011 (JP) ................... 2011-114590

(51) Int. Cl.
*G02B 15/14* (2006.01)
*G02B 7/10* (2006.01)

(52) U.S. Cl.
CPC ..................... *G02B 7/102* (2013.01)

(58) Field of Classification Search
CPC .......................................... G02B 7/102
USPC .................. 359/819, 823, 694–705
See application file for complete search history.

(56) References Cited

U.S. PATENT DOCUMENTS

| 5,680,251 | A | * | 10/1997 | Kato et al. | 359/557 |
| 6,639,730 | B2 | * | 10/2003 | Muto et al. | 359/694 |
| 7,218,459 | B2 | * | 5/2007 | Chen | 359/704 |
| 2011/0273786 | A1 | | 11/2011 | Ooya | |
| 2012/0002307 | A1 | | 1/2012 | Ooya et al. | |

FOREIGN PATENT DOCUMENTS

| JP | 2001-091997 | * | 6/2001 | ............ G03B 17/12 |
| JP | 2002-277711 | A | 9/2002 | |
| JP | 2005-189443 | * | 7/2005 | ............... G02B 7/04 |
| JP | 2010-164695 | A | 7/2010 | |
| JP | 2011-237575 | A | 11/2011 | |
| JP | 2012-13826 | A | 1/2012 | |
| JP | 2012-42649 | A | 3/2012 | |
| JP | 2012-141519 | A | 7/2012 | |
| JP | 2013-90075 | | 5/2013 | |

OTHER PUBLICATIONS

Office Action issued Feb. 6, 2015, in Japanese Patent Application No. 2011-114590.

* cited by examiner

*Primary Examiner* — Thomas K Pham
*Assistant Examiner* — Vipin Patel
(74) *Attorney, Agent, or Firm* — Oblon, McClelland, Maier & Neustadt, L.L.P.

(57) ABSTRACT

A lens barrel includes: a cam cylinder on which a plurality of cam grooves is formed; a plurality of lens groups that has equal to or more than one lens each; and a plurality of lens-holding frames that integrally holds the lens per lens group, has a cam follower each that engages with each cam groove, and is moved along an optical axis direction along a track of each cam groove, each lens-holding frame having: a lens supporting part; and a cylindrical part, and on an outer circumferential surface of which the cam follower is protrusively provided, wherein an inner circumferential part corresponding to a position of the cam follower in the cylindrical part of each lens-holding frame and a cylindrical part of a lens-holding frame positioned on an image plane side are arranged to always overlap in the optical axis direction.

14 Claims, 5 Drawing Sheets

LENS BARREL, IMAGING APPARATUS, AND INFORMATION DEVICE

CROSS-REFERENCE TO RELATED APPLICATIONS

The present application is based on and claims priority from Japanese patent application number 2011-114590, filed May 23, 2011, the disclosure of which is hereby incorporated by reference herein in its entirety.

BACKGROUND

The present invention relates to a lens barrel of an optical system that images an image of a photographic subject, an imaging apparatus that includes an imaging optical system using the lens barrel, and an information device.

A lens barrel constituting an imaging optical system in an imaging apparatus, such as a so-called digital camera or the like, is often subjected to a great impact due to being dropped accidentally, or by being hit against another object by a user, in a state of being attached to a body of the imaging apparatus, or in a state of being separated from a camera body as an interchangeable lens as an imaging optical system for a camera with an interchangeable lens such as a single-reflex camera or the like, or as a so-called core unit in which an imaging optical system and an image sensor part are integrated to be interchangeable.

That is, the above lens barrel has: an optical system that includes a plurality of lens groups each of which has equal to or more than one lens; and a cam mechanism that has a cam cylinder having a cam groove on a circumferential surface, and a lens-holding frame having a cam follower fitting the cam groove, and by means of the cam mechanism, the plurality of lens groups is driven along an optical axis direction, and the lens barrel constitutes a zoom lens or the like that changes a focal length, for example. In such a lens barrel, in many cases, measures to prevent the lens-holding frame from dropping off a cam connection when the above-described impact such as a dropping impact or the like is applied have been taken.

However, in a conventional lens barrel, in order to take measures against a dropping impact or the like, there are problems such that a component shape of each part becomes complex, and a diameter of a lens barrel increases. That is, in particular, in order to prevent a cam follower from dropping off a cam groove, taking a length, that is, a depth, of an engagement part of the cam follower and the cam groove to a sufficient degree has been carried out. In such a case, the diameter of a cam cylinder in which the cam groove is provided increases, as does the diameter of the lens barrel. Additionally, in the lens-holding frame having the cam follower, forming a shape that restricts deformation in the direction such that the cam follower drops off the cam groove due to an impact such as a dropping impact or the like has also been performed. In this case, the shapes of the lens-holding frame and a guide cylinder that limits the lens-holding frame to move only in the linear movement direction become complex, and the diameter of the lens barrel increases in order to form a shape that prevents deformation.

Thus, techniques that prevent disengagement of the cam connection due to the impact of the dropping impact or the like in the lens barrel are disclosed in, for example, Japanese patent application publication number 2002-277711, Japanese patent application publication number 2010-164695, and so on.

That is, in order that a cam engagement part does not easily drop off due to an external force in the optical axis direction that is applied to the lens barrel in an extending-type lens barrel, Japanese patent application publication number 2002-277711 discloses that a lens barrel includes: a lens-holding cylinder in which a cam follower part and a linear movement key part are provided; a cam cylinder in which a cam groove part that engages with the cam follower part and provides a driving force in the optical axis direction to the lens-holding cylinder is provided; and a guide cylinder in which a linear movement guide groove part that engages with the linear movement key part and guides the lens-holding cylinder in the optical axis direction is provided, and in the above lens barrel, a claw-shape part that protrudes in a circumferential direction is formed in the linear movement key part, and on an end surface in the circumferential direction of the linear movement guide groove part, a rail part with which the claw-shape part is capable of engaging in the diameter direction and which extends in the optical axis direction is formed, which prevents the cam follower part from dropping off to move in a diameter direction of the lens barrel with respect to the cam groove part in a case where an external force in the optical axis direction is applied to the lens-holding cylinder.

Given such a constitution, it is possible to reliably enhance any impact resistance of the lens barrel; however it is not possible to completely resolve problems such as the component shape of each part becoming complex, and the diameter of the lens barrel increasing.

Additionally, Japanese patent application publication number 2010-164695 discloses that a projection part that forms a cylindrical surface projecting along the optical axis direction on a photographic subject side is provided in a shutter unit arranged in a lens barrel part, and the projection part is inserted into an inner side of a lens-holding cylinder arranged closer to the photographic subject side than the shutter unit, and therefore deformation of the lens-holding cylinder is prevented.

With such a constitution, deformation resistance is enhanced, and impact resistance is improved; however, the position of the lens-holding cylinder is still limited, and the component shape of the shutter unit can become complex; and therefore, it is not possible to completely resolve problems such as an decrease in versatility of the shutter unit, and an increase in the diameter of the lens barrel.

SUMMARY

As described above, in lens barrels of the conventional zoom lens type disclosed in Japanese patent application publication number 2002-277711, Japanese patent application publication number 2010-164695, and the like, in order to take measures against an impact such as a dropping impact or the like, a component shape of each part becomes complex, and a diameter of a lens barrel increases.

An object of the present invention is to provide a lens barrel that is capable of improving impact resistance, by effectively dealing with impact such as dropping impact or the like, without complication of a component shape of each part and an increase of a diameter of a lens barrel, an imaging apparatus using the lens barrel, and an information device.

In order to achieve the above object, an embodiment of the present invention provides: a lens barrel comprising: a cam cylinder on an inner circumferential surface of which a plurality of cam grooves is formed; a plurality of lens groups that has equal to or more than one lens each; and a plurality of lens-holding frames that integrally holds the lens constituting the plurality of lens groups per lens group, has a cam follower each that engages with each of the cam grooves on the cam cylinder, and is moved forward and backward along an optical axis direction along a track of each of the cam grooves, each of the plurality of lens-holding frames having: a lens supporting part that supports equal to or more than one lens constituting a corresponding lens group; and a cylindrical part which is formed around the lens supporting part and integrally holds the lens supporting part, and on an outer circumferential surface of which the cam follower is protrusively provided, wherein an inner circumferential part corresponding to a position in the optical axis direction of the cam follower in the cylindrical part of each lens-holding frame corresponding to each lens group and a cylindrical part of a lens-holding frame corresponding to a lens group positioned on an image plane side of each lens group are arranged to always overlap in the optical axis direction.

BRIEF DESCRIPTION OF THE DRAWINGS

Each of FIGS. 4A and 4B is diagram illustrating a constitution of a chief part of the second lens group holding frame of the zoom lens barrel in FIG. 1.

Each of FIGS. 5A and 5B is diagram illustrating a constitution of a chief part of the fourth lens group holding frame of the zoom lens barrel in FIG. 1.

Each of FIGS. 6A and 6B is diagram illustrating a constitution of a chief part of the fifth lens group holding frame of the zoom lens barrel in FIG. 1.

DETAILED DESCRIPTION OF THE PREFERRED EMBODIMENTS

Figure 1:
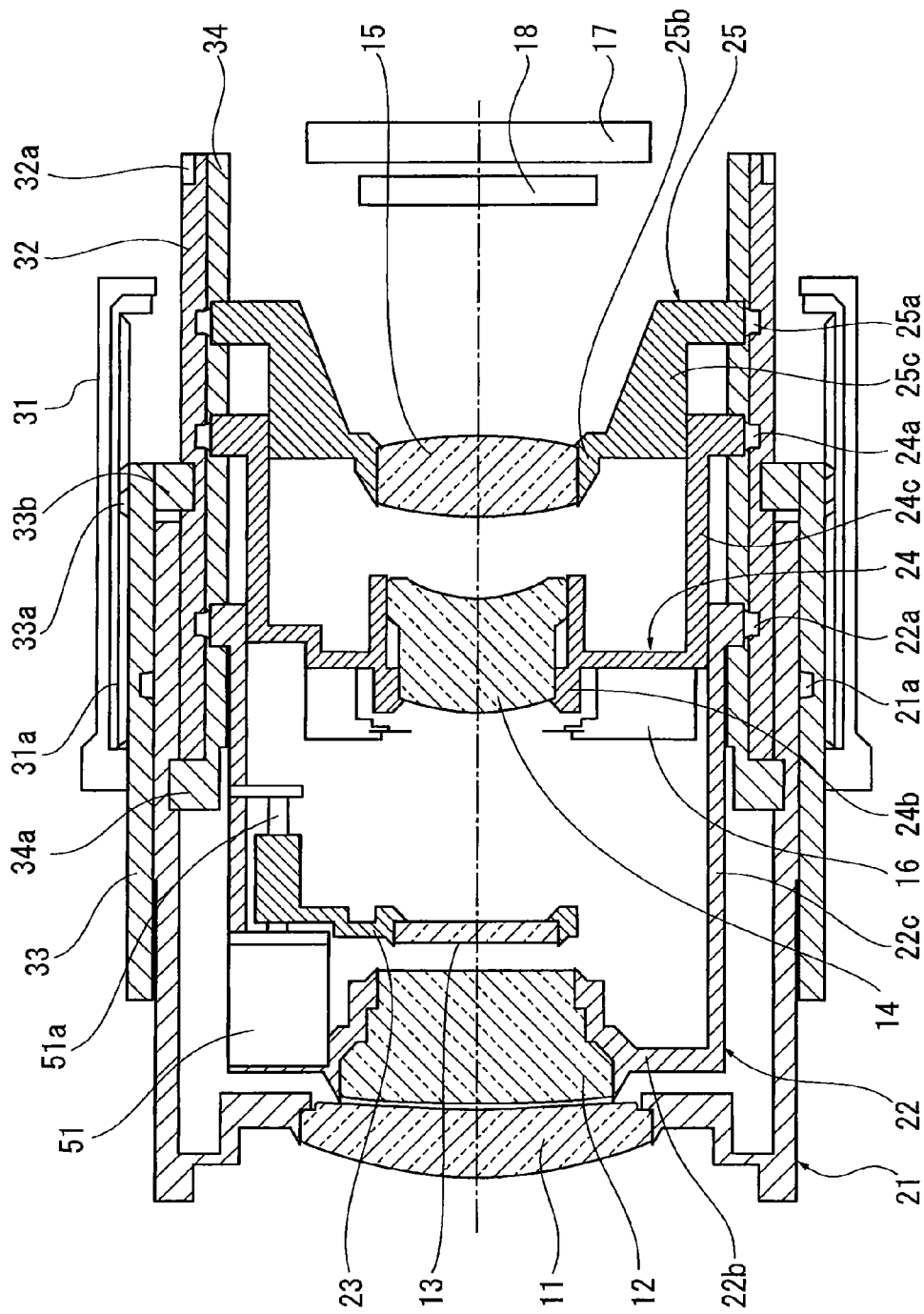
FIG. 1 is a longitudinal section diagram illustrating a constitution of a chief part of a zoom lens barrel as a lens barrel according to an embodiment of the present invention in a state of being at a short focus end, that is, a wide angle (WIDE) end, or being in a neighborhood of the above.

Prior to explaining a lens barrel according to an embodiment of the present invention in detail, firstly, a brief outline of a constitution of the lens barrel according to an embodiment of the present invention will be explained. The lens barrel according to the embodiment of the present invention includes: a cam cylinder on an inner circumferential surface of which a plurality of cam grooves is formed; a plurality of lens groups that has equal to or more than one lens each; and a plurality of lens-holding frames that integrally holds a lens constituting the plurality of lens groups per lens group, has a cam follower each that engages with each of the cam grooves on the cam cylinder, and is moved forward and backward along an optical axis direction along a track of each of the cam grooves, and further includes the following feature.

That is, each of the plurality of lens-holding frames has: a lens supporting part that supports equal to or more than one lens constituting a corresponding lens group; and a cylindrical part which is formed around the lens supporting part and integrally holds the lens supporting part, and on an outer circumferential surface of which the cam follower is protrusively provided, and an inner circumferential part corresponding to a position in the optical axis direction of a cam follower in a cylindrical part of each lens-holding frame corresponding to each lens group and a cylindrical part of a lens-holding frame corresponding to a lens group that is positioned on an image plane side of each lens group are arranged to always overlap in the optical axis direction.

Thus, an inner circumferential part corresponding to a position in an optical axis direction of a cam follower in a cylindrical part of each lens-holding frame corresponding to each lens group and a cylindrical part (an outer circumferential part of a cylindrical part) of a lens-holding frame corresponding to a lens group that is positioned on an image plane side of each lens group are arranged to always overlap in the optical axis direction, and therefore, in a case where an external force in the optical axis direction is applied to a lens-holding frame, a cylindrical part of a lens-holding frame is held from an inner circumferential side by a cylindrical part of a lens-holding frame of a lens group that is positioned on the image plane side, and deformation around a cam follower of the cylindrical part is suppressed, which prevents the cam follower from dropping off a cam groove. Therefore, it is not necessary to increase a depth of engagement of the cam groove, and form a special shape to prevent the cam follower from dropping off.

Additionally, in the lens barrel according to the embodiment of the present invention, it is preferable that a gap in a radial direction between cylindrical parts of the plurality of lens-holding frames that overlap in the optical axis direction be smaller than the size of engagement of the cam follower with respect to the cam groove.

Therefore, disengagement of a cam connection of a lens-holding frame is effectively suppressed, and it is possible to improve impact resistance.

In addition, in the lens barrel according to the embodiment of the present invention, it is preferable that cylindrical parts of the plurality of lens-holding frames that overlap in the optical axis direction extend along the optical axis direction, and the cam follower be provided around an end part on the image plane side of each of the cylindrical parts.

Therefore, particularly, disengagement of the cam connection of the lens-holding frame is suppressed by a simple constitution, and it is possible to improve impact resistance.

Additionally, in the lens barrel according to the embodiment of the present invention, it is preferable that in the plurality of lens-holding frames that overlap in the optical axis direction, a length along the optical axis direction of a cylindrical part of a lens-holding frame corresponding to a lens group positioned on an object side be longer than a length along the optical axis direction of a cylindrical part of a lens-holding frame corresponding to a lens group that is positioned on the image plane side.

Therefore, particularly, disengagement of the cam connection of the lens-holding frame is suppressed by a simple and effective constitution, and it is possible to improve impact resistance.

Additionally, in the lens barrel according to the embodiment of the present invention, the plurality of the lens groups makes it possible to constitute a zoom lens that has variable focal lengths.

Therefore, particularly, disengagement of the cam connection of the lens-holding frame constituting the lens barrel is effectively suppressed, and it is possible to improve impact resistance.

Additionally, in an imaging apparatus according to the embodiment of the present invention including an imaging optical system for imaging an image of a photographic subject, the imaging optical system includes the above-described lens barrel.

Therefore, particularly, in an imaging apparatus including an imaging optical system for imaging an image of a photographic subject, disengagement of the cam connection due to impact in the lens barrel constituting the imaging optical system is effectively suppressed, and it is possible to improve impact resistance.

Additionally, in an information device according to an embodiment of the present invention having an imaging function, an imaging optical system for imaging an image of a photographic subject to achieve the imaging function includes the above-described lens barrel.

Therefore, particularly, in an information device having an imaging function, in a lens barrel constituting the optical system for imaging an image of a photographic subject to achieve the imaging function, disengagement of the cam connection due to impact is effectively suppressed, and it is possible to improve impact resistance.

Hereinafter, the above-described lens barrel according to an embodiment of the present invention will be explained in detail with reference to the drawings.

FIGS. 1 to 7 illustrate a constitution of a chief part of a zoom lens barrel as a lens barrel according to an embodiment of the present invention.

FIG. 1 is a longitudinal section diagram illustrating the constitution of the chief part of the zoom lens barrel as the lens barrel according to the embodiment of the present invention in a state of being at a short focus end, that is, a wide angle (WIDE) end, or being in a neighborhood of the above.

Figure 2:
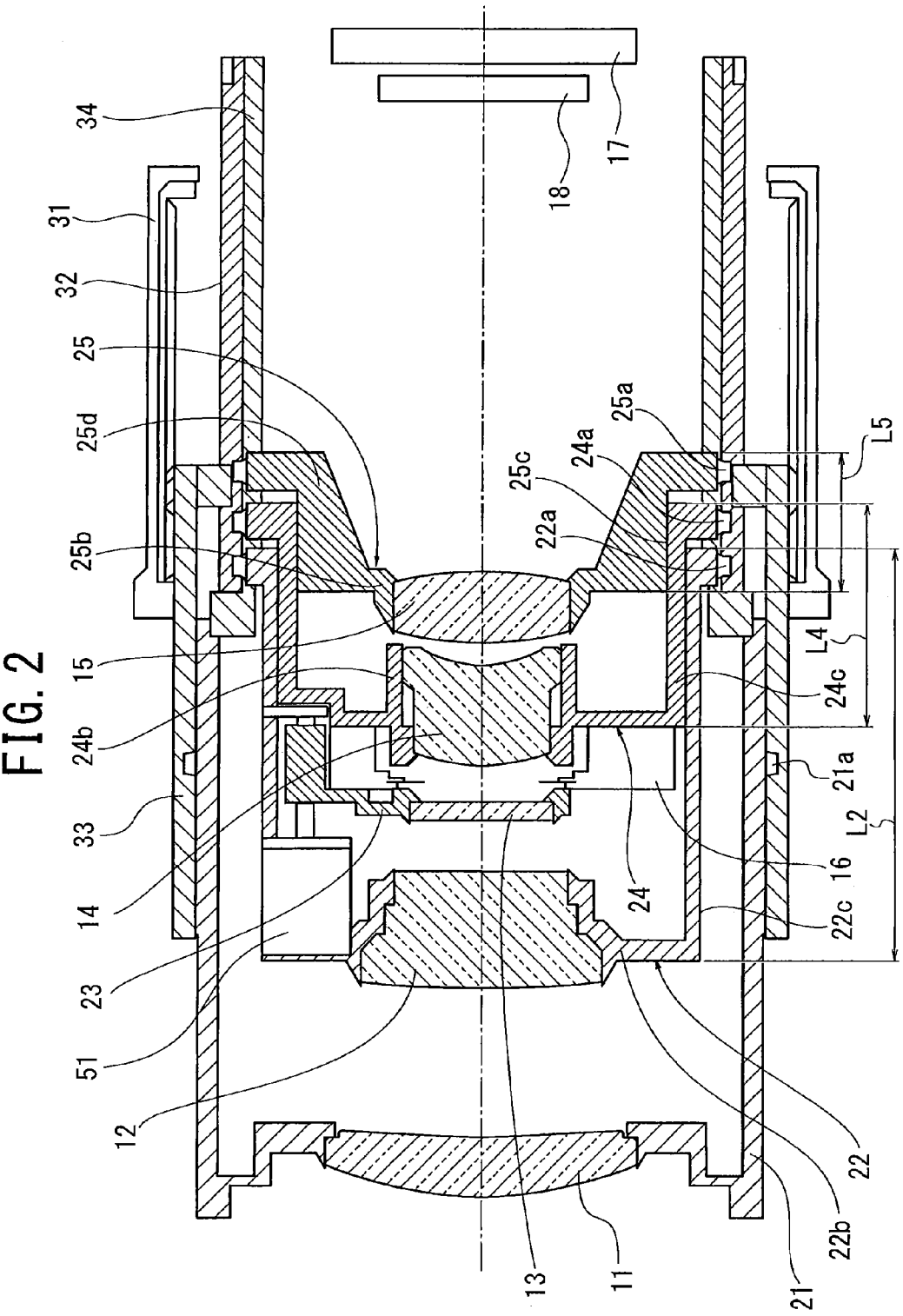
FIG. 2 is a longitudinal section diagram illustrating a constitution of a chief part of a zoom lens barrel in FIG. 1 in a state of being at a long focus end, that is, a telephoto (TELE) end, or being in a neighborhood of the above.

FIG. 2 is a longitudinal section diagram illustrating the constitution of the chief part of the zoom lens barrel in FIG. 1 in a state of being at a long focus end, that is, a telephoto (TELE) end, or being in a neighborhood of the above.

Figure 3:
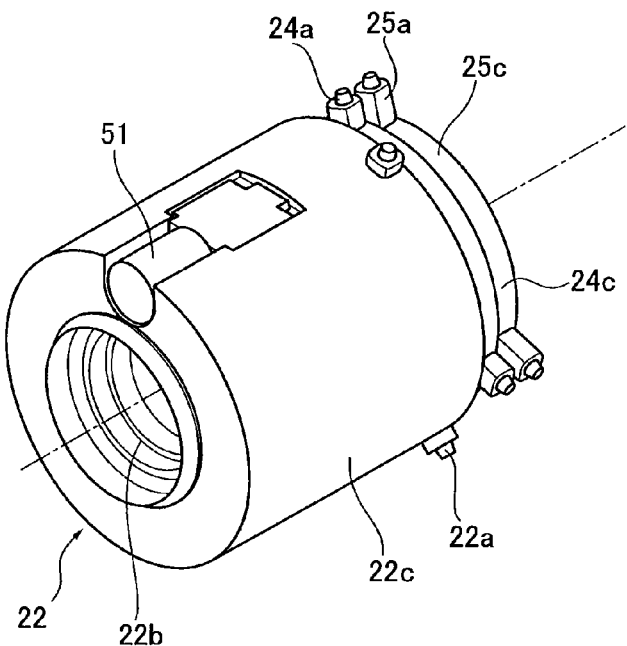
FIG. 3 is a perspective diagram illustrating a constitution of a part including a second lens group holding frame, a fourth lens group holding frame, and a fifth lens group holding frame of the zoom lens barrel in the telephoto (TELE) state in FIG. 2, seen from obliquely above a photographic subject side, that is, an object side.

FIG. 3 is a perspective diagram illustrating the constitution of the part including a second lens group holding frame, a fourth lens group holding frame, and a fifth lens group holding frame of the zoom lens barrel in the telephoto (TELE) state in FIG. 2, seen from obliquely above a photographic subject side, that is, an object side.

Figure 4A:
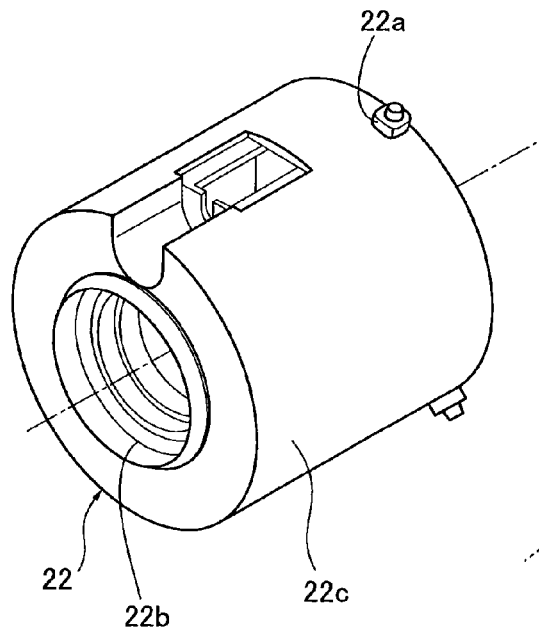
FIG. 4A is a perspective diagram of the second lens group holding frame seen from obliquely above a photographic subject side, that is, an object side.
Figure 4B:
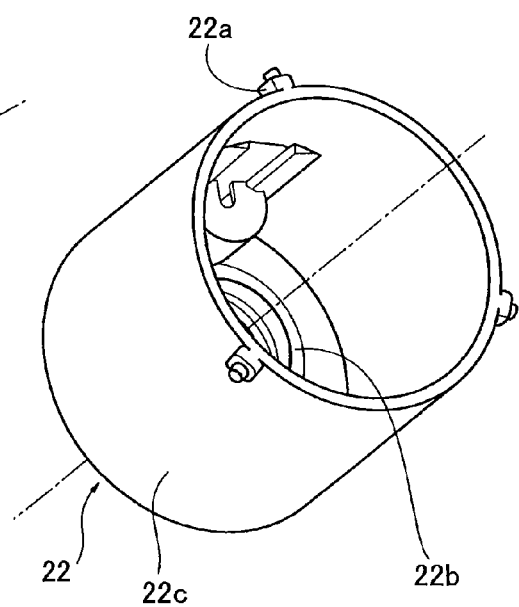
FIG. 4B is a perspective diagram of the second lens group holding frame seen from obliquely below an image sensor side, that is, an image plane side.

Each of FIGS. 4A and 4B is diagram illustrating a constitution of a chief part of the second lens group holding frame of the zoom lens barrel in FIG. 1, and FIG. 4A is a perspective diagram of the second lens group holding frame seen from obliquely above the photographic subject side, that is, the object side, and FIG. 4B is a perspective diagram of the second lens group holding frame seen from obliquely below an image sensor side, that is, an image plane side.

Figure 5A:
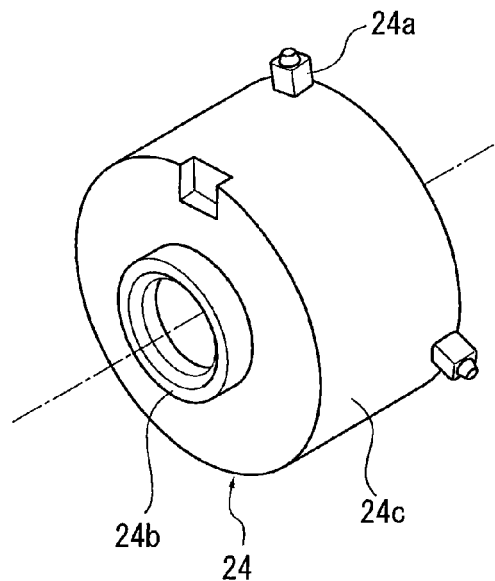
FIG. 5A is a perspective diagram of the fourth lens group holding frame seen from obliquely above a photographic subject side, that is, an object side.
Figure 5B:
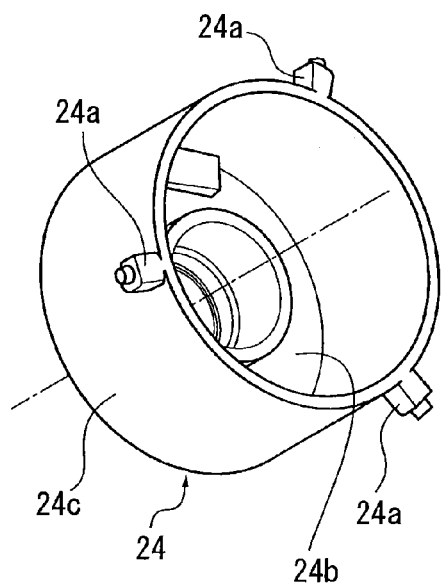
FIG. 5B is a perspective diagram of the fourth lens group holding frame seen from obliquely below an image sensor side, that is, an image plane side.

Each of FIGS. 5A and 5B is diagram illustrating a constitution of a chief part of the fourth lens group holding frame of the zoom lens barrel in FIG. 1, and FIG. 5A is a perspective diagram of the fourth lens group holding frame seen from obliquely above the photographic subject side, that is, the object side, and FIG. 5B is a perspective diagram of the fourth lens group holding frame seen from obliquely below the image sensor side, that is, the image plane side.

Figure 6A:
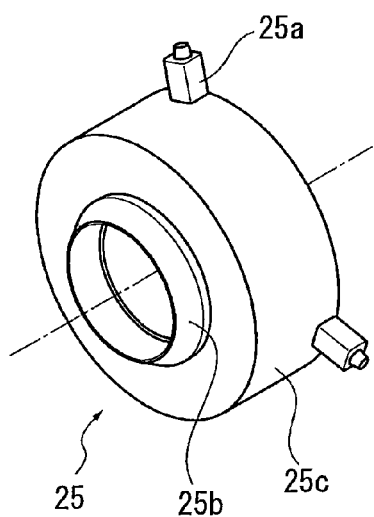
FIG. 6A is a perspective diagram of the fifth lens group holding frame seen from obliquely above a photographic subject side, that is, an object side.
Figure 6B:
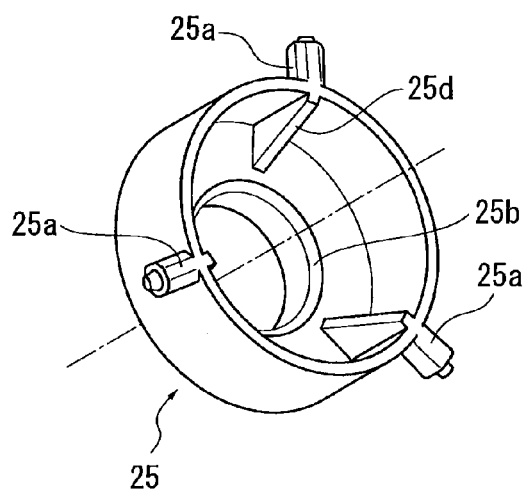
FIG. 6B is a perspective diagram of the fifth lens group holding frame seen from obliquely below an image sensor side, that is, an image plane side.

Each of FIGS. 6A and 6B is diagram illustrating a constitution of a chief part of the fifth lens group holding frame of the zoom lens barrel in FIG. 1, and FIG. 6A is a perspective diagram of the fifth lens group holding frame seen from obliquely above the photographic subject side, that is, the object side, and FIG. 6B is a perspective diagram of the fifth lens group holding frame seen from obliquely below the image sensor side, that is, the image plane side.

Figure 7:
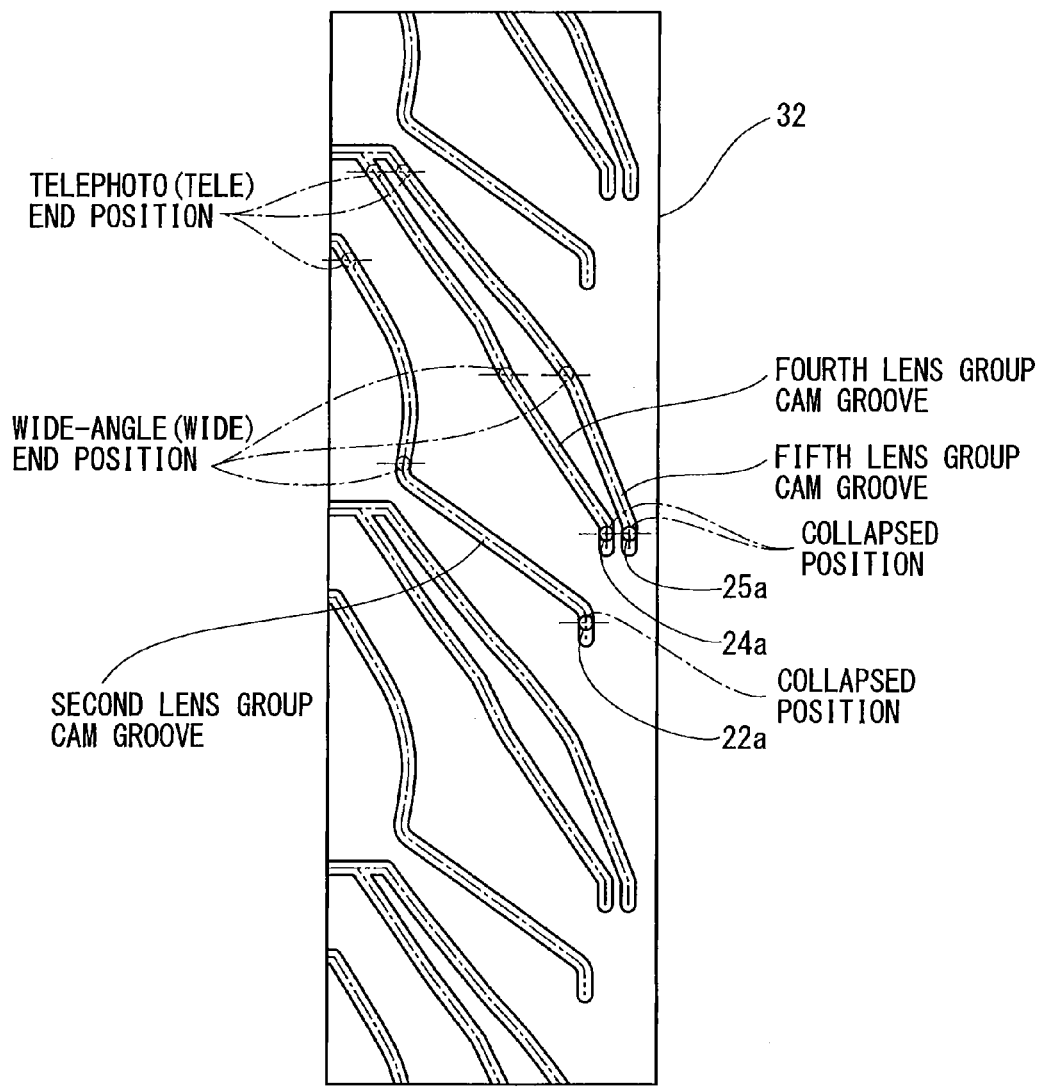
FIG. 7 is a development of an inner circumferential surface of a first rotating cylinder of the zoom lens barrel in FIG. 1 where cam grooves are formed.

FIG. 7 is a development of an inner circumferential surface of a first rotating cylinder of the zoom lens barrel in FIG. 1 where cam grooves are formed.

The zoom lens barrel illustrated in FIGS. 1 to 7 includes a first lens group 11, a second lens group 12, a third lens group 13, a fourth lens group 14, a fifth lens group 15, a shutter/aperture unit 16, a solid-state image sensor 17, a low-pass filter 18, a linear movement cylinder 21, a second lens group holding frame 22, a third lens group holding frame 23, a fourth lens group holding frame 24, a fifth lens group holding frame 25, a fixed frame 31, a first rotating cylinder 32, a second rotating cylinder 33, a linear movement liner 34, and a focus motor 51.

From the object side to the image plane side, in order, the first lens group 11, the second lens group 12, the third lens group 13, the fourth lens group 14, and the fifth lens group 15 are arranged, and between the third lens group 13 and the fourth lens group 14 the shutter/aperture unit 16 is arranged, and on the image plane side of the fifth lens group 15 the solid-state image sensor 17 for which a CMOS (Complementary Metal-Oxide Semiconductor) image sensor, a CCD (Charge-Coupled Device) image sensor, or the like is used is arranged. Those lens groups of the first lens group 11 to the fifth lens group 15 constitute a zoom lens that has variable focal lengths.

The first lens group 11 includes equal to or more than one lens, and is fixed and held by the linear movement cylinder 21 via a lens-holding frame that holds the first lens group 11. In the linear movement cylinder 21, a cam follower 21a that protrudes from an outer circumferential surface is provided, and the cam follower 21a engages with a cam groove that is provided on an inner circumferential surface of the second rotating cylinder 33.

The second lens group 12 includes equal to or more than one lens, and is fixed and held by the second lens group holding frame 22 as a lens-holding frame. In an end part on the image plane side, that is, a base end part (In FIG. 1, each end part), of the second lens group holding frame 22, a cam follower 22a that protrudes from an outer circumferential surface is provided. The cam follower 22a engages with a linear movement key groove formed by a through groove of the linear movement liner 34, and an end (protruding end) of the cam follower 22a engages with a cam groove that is provided on an inner circumferential surface of the first rotating cylinder 32 as a cam cylinder.

The third lens group 13 includes equal to or more than one lens, and is fixed and held by the third lens group holding frame 23. The third lens group holding frame 23 is supported by a lead screw 51a of the focus motor 51 fixed by the second lens group holding frame 22 via a nut mechanism or a rack mechanism (either of the nut mechanism and the rack mechanism are not illustrated), and integrally moves with the second lens group holding frame 22, and is driven along the optical axis direction with rotation of the focus motor 51 when focusing.

The fourth lens group 14 includes equal to or more than one lens, and is fixed and held by the fourth lens group holding frame 24 that is one of the plurality of the lens-holding frames. The fourth lens group holding frame 24 integrally holds the shutter/aperture unit 16, and in an end part on the image plane side, that is, a base end part (end part in FIG. 1) of the fourth lens group holding frame 24, a cam follower 24a that protrudes from an outer circumferential surface is provided. The cam follower 24a engages with a linear movement key groove formed by a through groove of the linear movement liner, and an end (protruding end) of the cam follower 24a engages with a cam groove that is provided on the inner circumferential surface of the first rotating cylinder 32 as a cam cylinder.

The fifth lens group 15 includes equal to or more than one lens, and is fixed and held by the fifth lens group holding frame 25. In an end part on the image plane side, that is, a base end part, of the fifth lens group holding frame 25 a cam follower 25a that protrudes from an outer circumferential surface is provided. The cam follower 25a engages with a linear movement key groove formed by a through groove of the linear movement liner 34, and an end (protruding end) of the cam follower 25a engages with a cam groove that is provided on the inner circumferential surface of the first rotating cylinder 32.

On an inner circumferential surface of the fixed cylinder 31, a helicoid 31a is formed, and on the helicoid 31a, a helicoid 33a that is formed on an outer circumferential surface in an end part on the image plane side, that is, a base end part of the second rotating cylinder 33 as another cam cylinder is screwed.

The first rotating cylinder 32 is sandwiched between a key part 34a that is provided in an end, that is, an end part on the object side (left end side in FIG. 1) and a base member (not illustrated), and a gear part 32a is formed in the end part on the image plane side, that is, an outer circumferential side of a base end part.

The helicoid 33a on the outer circumferential surface in the base end part of the second rotating cylinder 33 screws on the helicoid 31a on the inner circumferential surface of the fixed cylinder 31, and a driving pin 33b that is provided in the base end part and protrudes on an inner circumferential side of the second rotating cylinder 33 engages with a linear movement groove that is provided on an outer circumferential surface of the first rotating cylinder 32. With rotation of the first rotating cylinder 32, rotation is transmitted to the second rotating cylinder 33 by the driving pin 33b, and the second rotating cylinder 33 moves forward and backward along the optical axis direction by the helicoid 31a.

The key part 34a of the linear movement liner 34 engages with a linear movement groove (not illustrated) formed on an inner circumferential surface of the linear movement cylinder 21, and the cam follower 22a of the second lens group holding frame 22, the cam follower 24a of the fourth lens group holding frame 24, and the cam follower 25a of the fifth lens group holding frame 25 engage with linear movement key grooves formed by through grooves that are provided in the linear movement liner 34, respectively, and thereby the linear movement liner 34 regulates rotation of each of the lens groups 11 to 15.

By the above-described constitution, driving force by a zoom motor (not illustrated) is transmitted properly by the gear part 32a of the first rotating cylinder 32 via a gear, and the first rotating cylinder 32 is rotated, and with the rotation of the first rotating cylinder 32, the second rotating cylinder 33 is rotated, and via a cam mechanism between the second rotating cylinder 33 and the first rotating cylinder 32, the linear movement cylinder 21, the second lens group holding frame 22, the third lens group holding frame 23, the fourth lens group holding frame 24, and the fifth lens group holding frame 25 are moved forward and backward along the optical axis direction, and the first lens group 11, the second lens group 12, the third lens group 13, the fourth lens group 14, and the fifth lens group 15 are moved in a predetermined manner, and thereby a zooming operation is performed.

Next, a lens group holding frame that is a feature of the present invention will be explained in detail with reference to the drawings.

The second lens group holding frame 22 has a lens supporting part 22b that supports the second lens group 12, and a cylindrical part 22c that is formed by extending backward along the optical axis direction, that is, in the image plane direction from around a vicinity of the lens supporting part 22b. In the base end, that is, the end part on the image plane side, of the cylindrical part 22c, the cam follower 22a is protrusively provided (in this embodiment, three cam followers 22a that are arranged at equal angle intervals on the same circumference, that is, that are arranged at equal intervals in the circumferential direction, are protrusively provided. (See FIGS. 4A and 4B)). The size of an outer diameter of the cylindrical part 22c is determined to be a size that fits the second lens group 12 and an outer shape of the focus motor 51 that is arranged in a vicinity of the second lens group 12 and its outer circumferential part, and a size of an inner diameter is defined by having a predetermined thickness.

The fourth lens group holding frame 24 has a lens supporting part 24b that supports the fourth lens group 14, and a cylindrical part 24c that is formed by extending backward along the optical axis direction, that is, in the image plane direction from around a vicinity of the lens supporting part 24b. In the base end, that is, the end part on the image plane side, of the cylindrical part 24c, the cam follower 24a is protrusively provided (in this embodiment, three cam followers 24a that are arranged at equal angle intervals on the same circumference, that is, that are arranged at equal intervals in the circumferential direction, are protrusively provided. (see FIGS. 5A and 5B)). The size of an outer diameter of the cylindrical part 24c is slightly smaller than the size of an inner diameter of the cylindrical part 22c of the second lens group holding frame 22, and is determined to have a predetermined gap (not press-contacted, but with a small enough gap), and to be capable of being interpolated, and the size of its inner diameter is determined by having a predetermined thickness.

The fifth lens group holding frame 25 has a lens supporting part 25b that supports the fifth lens group 15, and a cylindrical part 25c that is formed by extending backward along the optical axis direction, that is, in the image plane direction from around the vicinity of the lens supporting part 25b. In the base end, that is, the end part on the image plane side, of the cylindrical part 25c, the cam follower 25a is protrusively provided (in this embodiment, three cam followers 25a that are arranged at equal angle intervals on the same circumference, that is, that are arranged at equal intervals in the circumferential direction, are protrusively provided. (See FIGS. 6A and 6B)). On an inner circumferential side of the cylindrical part 25c, a reinforcing rib 25d is provided corresponding to a position of the cam follower 25a (in this embodiment, three reinforcing ribs 25d are provided. (See FIG. 6B)). The size of an outer diameter of the cylindrical part 25c is slightly smaller than the size of an inner diameter of the cylindrical part 24c of the fourth lens group holding frame 24, and is determined to have a predetermined gap (not press-contacted, but with a small enough gap), and to be able to be interpolated, and the size of its inner diameter is determined by having a predetermined thickness.

The size in the diameter direction of the cylindrical part 22c of the second lens group holding frame 22 is determined by sizes of the second lens group 12 and the focus motor 51. The size in the diameter direction of the cylindrical part 24c of the fourth lens group holding frame 24 is determined so as to fit in an inner circumferential part of the cylindrical part 22c of the second lens group holding frame 22, and the size in the diameter direction of the cylindrical part 25c of the fifth lens group holding frame 25 is determined so as to fit in an inner circumferential part of the cylindrical part 24c of the fourth lens group holding frame 24. It is not necessary to especially increase the diameter of the cylindrical part 22c of the second lens group holding frame 22 in order for a cylindrical part of another lens group holding frame to fit in, and therefore the diameter of the lens barrel does not increase.

Next, the length in the optical direction of each of the above-described cylindrical parts 22c, 24c, and 25c will be explained.

The second lens group holding frame 22 is arranged in a maximum extended position in a state of being at the telephoto (TELE) end in FIG. 2. A length L2 of the cylindrical part 22c is determined such that in the above maximum extended position, the cam follower 22a maintains engagement with the cam groove provided on the inner circumferential surface of the first rotating cylinder 32.

Regarding the fourth lens group holding frame 24, a length L4 of the cylindrical part 24c is determined such that in a state of being at the wide angle (WIDE) end in FIG. 1 where a distance to a prior lens group, that is, a lens group positioned on the object side of the fourth lens group 14, the second lens group holding frame 22 corresponding to the second lens group 12 which is immediately prior becomes largest, an inner circumferential part of the cylindrical part 22c of the second lens group holding frame 22 and the cylindrical part 24c (an outer circumferential part of the cylindrical part 24c) of the fourth lens group holding frame 24 maintain an overlap state in the optical axis direction, and in a state of being at the telephoto (TELE) end where the distance to the second lens group holding frame 22 becomes smallest, the cam follower 24a of the fourth lens group holding frame 24 does not interfere with the end part on the image plane side, that is, the base end, of the cylindrical part 22c of the second lens group holding frame 22.

Regarding the fifth lens group holding frame 25, a length L5 of the cylindrical part 25c is determined such that in a state of being at the wide angle (WIDE) end in FIG. 1 where a distance to a prior lens group, that is, a lens group positioned on the object side of the fifth lens group 15, the fourth lens group holding frame 24 corresponding to the fourth lens group 14 which is immediately prior becomes largest, an inner circumferential part of the cylindrical part 24c of the fourth lens group holding frame 24 and the cylindrical part 25c (an outer circumferential part of the cylindrical part 25c) of the fifth lens group holding frame 25 maintain an overlap state in the optical axis direction, and in a state of being at the telephoto (TELE) end where the distance to the fourth lens group holding frame 24 becomes smallest, the cam follower 25a of the fifth lens group holding frame 25 does not interfere with the end part on the image plane side, that is, the base end, of the cylindrical part 24c of the fourth lens group holding frame 24.

As described above, each of the lengths L2, L4, and L5 of the cylindrical parts 22c, 24c, and 25c of the second, fourth, and fifth lens group holding frames 22, 24, and 25 is determined such that in a zoom area ranging from the wide angle (WIDE) end to the telephoto (TELE) end, the inner circumferential parts of the cylindrical parts 22c and 24c of the lens group holding frames 22 and 24, and the cylindrical parts 24c and 25c (the outer circumferential parts of the cylindrical parts 24c and 25c) of the fourth and fifth lens group holding frames 24 and 25 that are respectively arranged on the image plane side of the second and fourth lens group holding frames 22 and 24 always overlap in the optical axis direction, respectively.

In an inner circumferential surface of the first rotating cylinder 32, as the development is illustrated in FIG. 7, cam grooves for driving each of the second lens group holding frame 22 (second lens group 12), the fourth lens group holding frame 24 (fourth lens group 14), and the fifth lens group holding frame 25 (fifth lens group 15) are formed. Each of the cam followers 22c, 24c, and 25c of each of the second, fourth, and fifth lens group holding frames 22, 24, and 25 engage with each of the cam grooves of each of a second lens group cam, a fourth lens group cam, and a fifth lens group cam formed in the inner circumferential surface of the first rotating cylinder 32. With rotation of the first rotating cylinder 32, each of the second lens group holding frame 22 (second lens group 12), the fourth lens group holding frame 24 (fourth lens group 14), and the fifth lens group holding frame 25 (fifth lens group 15) is driven to a required zoom position.

Next, an effect of the above-described lens barrel in a case where an impact such as a dropping impact or the like occurs will be explained.

Since the second lens group holding frame 22, the fourth lens group holding frame 24, and the fifth lens group holding frame 25 are arranged inside of the lens barrel, an external force is not applied directly. Due to acceleration generated by impact such as dropping or the like, a load is applied to a cam connection part of a cam groove and a cam follower that supports each of the lens group holding frames.

Since the length L2 of the cylindrical part 22c of the second lens-holding frame 22 is long, and the cylindrical part 22c exists on an inner circumferential side of the first rotating cylinder 32 in a direction where the cam follower 22a drops off a cam groove of the first rotating cylinder 32, the cylindrical part 22c is easily deformed when an impact is applied. However, as described above, the inner circumferential part of the cylindrical part 22c and the cylindrical part 24c of the fourth lens group 24 are arranged to always overlap in the optical axis direction, and, therefore, deformation of the cylindrical part 22c of the second lens group holding frame 22 is suppressed by the cylindrical part 24c of the fourth lens group holding frame 24, which prevents the cam follower 22a from dropping off the cam groove of the first rotating cylinder 32.

Likewise, regarding the fourth lens group holding frame 24, the inner circumferential part of the cylindrical part 24c and the cylindrical part 25c of the fifth lens group holding frame 15 are arranged so as to always overlap in the optical axis direction, and therefore when an impact is applied, deformation of the cylindrical part 24c of the fourth lens group holding frame 24 is suppressed by the cylindrical part 25c of the fifth lens group holding frame 25, which prevents the cam follower 24a from dropping off a cam groove of the first rotating cylinder 32.

In addition, regarding the fifth lens group holding frame 25, it is not possible to suppress deformation of the cylindrical part 25c by using another component, because no other lens group holding frame enters an inner circumferential side of the fifth lens group holding frame 25. However, the length L5 of the cylindrical part 25*c* of the fifth lens group holding frame 25 is short, and therefore deformation strength is high, and additionally, the reinforcing rib 25*d* is arranged on the inner circumferential side corresponding to the position of the cam follower 25*a* on the outer circumference; accordingly it is possible to suppress deformation around the cam follower 25*a*, and the cam follower 25*a* does not drop off the cam groove.

As described above, in the lens barrel according to the embodiment of the present invention, an inner circumferential part of a cylindrical part of each lens-holding frame and a cylindrical part of a lens group holding frame subsequently arranged on the image plane side always overlap in the optical axis direction. Accordingly, in a case where an external force such as impact is applied, a vicinity of a cam follower is reinforced and deformation around the cam follower is suppressed by the cylindrical part of the lens group holding frame that is subsequently arranged on the image plane side, which prevents the cam follower from dropping off a cam groove, and impact resistance is improved.

Since the impact resistance is improved by the cylindrical part of the lens group holding frame, it is not necessary to increase the depth of engagement of the cam follower and the cam groove such that the cam follower does not drop off the cam groove. Thus, it is possible to maintain the diameter of a rotating cylinder where each cam groove is provided at a minimum, and it is possible to improve the impact resistance without increasing the diameter of the lens barrel. Additionally, a particular shape for suppressing deformation in the direction where the cam follower drops off the cam groove is not necessary; and therefore the shape of each component does not have to be complex, and the diameter of the lens barrel does not have to be increased by using a particular shape for suppressing the deformation.

The lens barrel according to the embodiment of the present invention is applicable to an imaging apparatus such as a digital camera or the like, an information device such as a portable information terminal device or the like as typified by a mobile phone, an image input device, and the like.

An imaging apparatus such as a digital camera or the like includes an imaging lens as an imaging optical system, and the above-described lens barrel according to the embodiment of the present invention is applicable to the imaging apparatus as a lens barrel of the imaging lens. Such an imaging apparatus is advantageous as it is difficult to damage when a large impact is applied.

There is a known information device such as a portable information terminal device or the like as typified by a mobile phone that includes an imaging function equivalent to a still camera, a video camera, or the like, and the above-described lens barrel is applicable to an information device as a lens barrel of an imaging lens having such an imaging function. Such an information device is also advantageous in that damage is unlikely to occur when a large impact is applied According to the embodiment of the present invention, it is possible to provide a lens barrel that effectively deals with an impact such as a dropping impact or the like, and improves impact resistance, without complicating a component shape of each part and increasing the diameter of a lens barrel, an imaging apparatus, and an information device.

According to the embodiment of the present invention, it is possible to effectively deal with an impact such as a dropping impact without complicating a component shape of each part and increasing the diameter of a lens barrel, thus improving impact resistance.

According to the embodiment of the present invention, when an external force in the optical axis direction is applied, the vicinity of a cam follower is reinforced and supported by a cylindrical part of a lens-holding frame arranged on the image plane side, which prevents the cam follower from dropping off a cam groove. Accordingly, it is not necessary to increase the depth of an engagement part of the cam groove, and form a particular shape to prevent the cam follower from dropping, and it is possible to suppress an increase of the diameter of the lens barrel and improve impact resistance.

Although the present invention has been described in terms of exemplary embodiments, it is not limited thereto. It should be appreciated that variations may be made in the embodiments described by persons skilled in the art without departing from the scope of the present invention as defined by following claims.

What is claimed is:

1. A lens barrel comprising:
   a cam cylinder on an inner circumferential surface of which a plurality of cam grooves is formed;
   a fixed frame arranged around the cam cylinder;
   a plurality of lens groups that has one or more lenses per lens group; and
   at least three lens-holding frames, each of which frames integrally holds at least one lens of the one or more lenses of a corresponding lens group, has a cam follower that engages with at least one of the cam grooves on the cam cylinder, and is moved forward and backward along an optical axis direction along a track of each of the cam grooves with rotation of the cam cylinder relative to the fixed frame,
   each of the at least three lens-holding frames having:
     a lens supporting part that supports the at least one lens of the one or more lenses of the corresponding lens group; and
     a cylindrical part which is formed around the lens supporting part and integrally holds the lens supporting part, and on an outer circumferential surface of which the cam follower is protrusively provided,
   wherein an inner circumferential part of the cylindrical part of each of the at least three lens-holding frames corresponding to each of the lens group and the cylindrical part of each of the three lens-holding frames corresponding to the lens group positioned on an image plane side of each of the lens group are arranged to always overlap in the optical axis direction in a range of positions between and including a wide-angle position and a telephoto position of the lens barrel, and
   wherein the cylindrical part of each of the at least three lens-holding frames corresponding to the lens group arranged on the most image plane side is provided with a reinforcing rib on an inner circumferential side corresponding to a position of the cam follower on the outer circumferential surface of a continuous cylindrical portion of the cylindrical part.

2. The lens barrel according to claim 1, wherein a gap in a radial direction between the cylindrical parts of the at least three of the lens-holding frames that overlap in the optical axis direction is smaller than a size of engagement of the cam follower with respect to the cam groove.

3. The lens barrel according to claim 1, wherein the cylindrical parts of the at least three of the lens-holding frames that overlap in the optical axis direction extend along the optical axis direction, and the cam follower is provided around an end part on the image plane side of each of the cylindrical parts.

4. The lens barrel according to claim 1, wherein in the at least three of the lens-holding frames that overlap in the optical axis direction, a length along the optical axis direction of the cylindrical part of the lens-holding frame corresponding to the lens group positioned on an object side is longer than a length along the optical axis direction of the cylindrical part of the lens-holding frame corresponding to the lens group positioned on the image plane side than the lens group positioned on the object side.

5. The lens barrel according to claim 1, wherein the plurality of the lens groups constitutes a zoom lens that has variable focal lengths.

6. An imaging apparatus comprising:
an imaging optical system that images an image of a photographic subject in which the lens barrel according to claim 1 is used.

7. An information device having an imaging function comprising:
an imaging optical system that images an image of a photographic subject so as to achieve the imaging function in which the lens barrel according to claim 1 is used.

8. The lens barrel according to claim 1, wherein the range of positions includes a maximally-extended position and a minimally-extended position of the lens barrel.

9. The lens barrel according to claim 8, wherein a distance along the optical axis direction between the lens group on the most image plane side and an immediately adjacent lens group is smallest at the telephoto position of the lens barrel.

10. The lens barrel according to claim 1, wherein a distance along the optical axis direction between the lens group on the most image plane side and an immediately adjacent lens group is smallest at the telephoto position of the lens barrel.

11. A lens barrel comprising:
a cam cylinder on an inner circumferential surface of which a plurality of cam grooves is formed;
a fixed frame arranged around the cam cylinder;
a plurality of optical member groups that has one or more optical members per optical member group; and
at least three optical member-holding frames, each of which frames integrally holds at least one optical member of the one or more optical members of a corresponding optical member group, has a cam follower that engages with at least one of the cam grooves on the cam cylinder, and is moved forward and backward along an optical axis direction along a track of each of the cam grooves with rotation of the cam cylinder relative to the fixed frame,
each of the at least three of optical member-holding frames having:
an optical member supporting part that supports the at least one optical member of the one or more optical members of the corresponding optical member group; and
a cylindrical part which is formed around the optical member supporting part and integrally holds the optical member supporting part, and on an outer circumferential surface of which the cam follower is protrusively provided,
wherein an inner circumferential part of the cylindrical part of each of the at least three optical member-holding frames corresponding to each of the optical member group and the cylindrical part of each of the three optical member-holding frames corresponding to the optical member group positioned on an image plane side of each of the optical member group are arranged to always overlap in the optical axis direction in a range of positions between and including a wide-angle position and a telephoto position of the lens barrel, and
wherein the cylindrical part of each of the at least three optical member-holding frames corresponding to the optical member group arranged on the most image plane side is provided with a reinforcing rib on an inner circumferential side corresponding to a position of the cam follower on the outer circumferential surface of a continuous cylindrical portion of the cylindrical part.

12. The lens barrel according to claim 11, wherein the range of positions includes a maximally-extended position and a minimally-extended position of the lens barrel.

13. The lens barrel according to claim 12, wherein a distance along the optical axis direction between an optical member group on the most image plane side and an immediately adjacent optical member group is smallest at the maximally-extended position of the lens barrel.

14. The lens barrel according to claim 11, wherein a distance along the optical axis direction between an optical member group on the most image plane side and an immediately adjacent optical member group is smallest at the telephoto position of the lens barrel.

* * * * *